United States Patent Office 2,725,295
Patented Nov. 29, 1955

2,725,295

HARDENING OF GELATIN WITH ORGANIC ACID CHLORIDES

Charles F. H. Allen and Burt H. Carroll, Rochester, N. Y., assignors to Eastman Kodak Company, Rochester, N. Y., a corporation of New Jersey No Drawing. Application July 17, 1952, Serial No. 299,500

8 Claims. (Cl. 95—7)

This invention relates to the hardening of gelatin, particularly in photographic emulsion form, by incorporating therewith a dicarboxylic or a disulfonic acid chloride in which the carboxylic or sulfonic acid groups are separated by at least 3 carbon atoms.

It is desirable, particularly in photography, to harden gelatin emulsion layers so as to render those layers more resistant to water, particularly to photographic processing solutions in which rapid changes of pH between different solutions and prolonged treatments with solutions at elevated temperature, for example, as high as 100° F., are encountered. The compounds which have heretofore been found useful in preventing the swelling and melting of gelatin in the processing of photographic emulsions fall under 4, or possibly 3, classes as follows (1) metallic salts, such as those of chromium, aluminum and zirconium; (2) aldehydes, such as formaldehyde or mucochloric acid; (3) diketones; (4) quinones, which possibly may be considered diketones. However, substantially all the hardeners which have been heretofore suggested have had more or less detrimental characteristics, such as in promoting increase in fog in the emulsions in which they are used, or causing speed loss of those emulsions upon storage of the same.

One object of our invention is to provide for the hardening of gelatin by means of hardeners which have no known detrimental effects upon photographic emulsions. Another object of our invention is to provide for the hardening of gelatin by the addition thereto of materials which apparently cross link with the gelatin by means of two or more reactive groups, each of which may react with a polypeptide chain. A further object of our invention is to render gelatin more resistant to water by mixing therewith, under certain prescribed conditions, aromatic dicarboxylic acid chloride or sulfonyl chloride compounds whereby swelling and melting of the gelatin is prevented under the conditions ordinarily met with in processing photographic emulsion layers. Other objects of our invention will appear herein.

In accordance with our invention, an aromatic polycarboxylic acid chloride or an aromatic polysulfonyl chloride is added to a gelatin composition, which may then be employed, such as for applying a coating to a surface. As these compounds ordinarily react with water or hydroxyl compounds, it is particularly desirable to first dissolve them in anhydrous solvents, such as water-soluble ethers or ketones, and then add their solution to the aqueous gelatin solutions under conditions of good mixing and with the pH of the gelatin solution within the range of 7.5–9.0. It may be necessary to add alkali from time to time to the gelatin solution to maintain the pH within the range specified. After the completion of the addition of the chloride, the pH is preferably lowered to a pH of less than 6.5, such as to a pH within the range of 6–6.5, by adding acid such as dilute $H_2SO_4$, acetic acid, citric acid or the like. We have found that, by thus lowering the pH, the effect produced by the hardening chloride is maintained for a longer period then where such pH lowering is not employed.

Some of the aromatic polysulfonyl chlorides and polycarboxylic acid chlorides which we have found to be useful for hardening gelatin, in accordance with our invention, are 1,5-naphthalenedisulfonyl chloride, 4,4'-diphenyldisulfonyl chloride, 4,4'-diphenylmethanedisulfonyl chloride and terephthaloyl chloride. However, it is to be understood that this list is not limiting, as any aromatic sulfonyl chloride or aromatic carboxylic acid chloride having at least 2 sulfonyl chloride or carboxylic acid chloride groups, separated by 4 or more carbon atoms, may be employed for hardening gelatin in accordance with our invention.

The solvents which are employed to dissolve these hardening agents, preparatory to adding them to the aqueous gelatin solutions, are desirably water-soluble ethers or ketones, 1,4-dioxane and acetone being good examples of solvents useful in this connection. The amount of hardening agent used is not critical, as any amount added under the conditions described will result in hardening of the gelatin; however, it is desired that the amount of chloride added be sufficient to assure the substantial hardening of the gelatin which is employed. For instance, the amount of hardening agent added should be at least 2% of the weight of the gelatin which is present in the composition to be hardened. A convenient range for the use of such hardening agent is 3–10% of the gelatin which is employed in the composition to be hardened.

After the hardening agent has been added to the aqueous gelatin solution at an alkaline pH and the pH remains constant, it is desirable to then lower the same to a pH within the range of 6–6.5, whereupon the composition so prepared may be coated out onto a surface which will support the gelatin layer. This support may be paper, cellulose ester film base, cloth, glass or any other suitable surface to receive such layer. It will be found that the gelatin layer thus formed is much more resistant to the effects of treatment with aqueous solutions than is a corresponding layer without any hardening treatment.

The following examples illustrate our invention:

Example 1

50 cc. of a photosensitive emulsion, containing 0.12 mol of silver halide and 3.7 grams of gelatin, were adjusted to a pH of 8.5 with sodium hydroxide. There was then added thereto 0.30 gram of 4,4'-diphenylmethanedisulfonyl chloride in solution in anhydrous dioxane, together with sodium hydroxide from time to time to keep the pH of the mass at approximately 8. The mass was held at 40° C. after the addition was completed until the action of the hardening agent on the gelatin was complete, as indicated by a constant pH. The pH of the mass was then adjusted to 6.3, and the emulsion so formed was coated and dried. It was found that the coating thus obtained resisted the effects of water up to a temperature of over 140° F. in contrast with a coating of the emulsion without the hardening addition, the latter coating melting at less than 95° in water.

Example 2

50 cc. of an emulsion of the same type as employed in the preceding example were adjusted to a pH of 8.5 with sodium hydroxide. 0.10 gram of naphthalene-1,5-disulfonyl chloride, dissolved in anhydrous 1,4 dioxane, was slowly added to the emulsion with vigorous stirring, the pH thereof being held at 8.5 by the addition of sodium hydroxide from time to time. After the pH had become stabilized, the mass was adjusted to a pH of 6.3 A coating was made from this emulsion and dried. It was found that this emulsion layer was not melted when immersed in water until the temperature of the water was over 150° F.

We claim:

1. A method of preparing gelatin compositions adapted to the forming of hardened layers which comprises incorporating in a gelatin solution at a pH of 7.5–9 a compound selected from the group of the aromatic dicarboxylic acid chlorides and the aromatic disulfonic acid chlorides in which the carboxylic or sulfonic acid chloride groups are separated by at least 4 carbon atoms, and then lowering the pH of the composition to less than 6.5 by adding an acidic material thereto prior to coating out onto a support.

2. A composition of matter adapted to form hardened layers which comprises the product which results from the addition to an aqueous solution of gelatin at a pH of 7.5–9.0 of a small proportion of a compound selected from the group consisting of the aromatic dicarboxylic acid chlorides and the aromatic disulfonic acid chlorides in which the carboxylic acid chloride or sulfonic acid chloride groups therein are separated only by at least four carbon atoms.

3. A gelatino silver halide photographic emulsion adapted to form hardened layers resulting from the addition to a gelatino silver halide photographic emulsion at a pH of 7.5–9.0 of a small proportion of a compound selected from the group consisting of the aromatic dicarboxylic acid chlorides and the aromatic disulfonic acid chlorides in which the carboxylic acid chloride or sulfonic acid chloride groups are separated only by at least four carbon atoms.

4. A composition of matter adapted to form hardened layers which comprises the product which results from the addition to an aqueous solution of gelatin at a pH of 7.5–9.0 of a small proportion of an aromatic dicarboxylic acid chloride in which the carboxylic acid chloride groups are separated by at least 4 carbon atoms.

5. A composition of matter adapted to form hardened lyaers which comprises the product which results from the addition to an aqueous solution of gelatin at a pH of 7.5–9.0 of a small proportion of an aromatic disulfonic acid chloride in which the sulfonic acid chloride groups are separated by at least 4 carbon atoms.

6. A composittion of matter adapted to form hardened layers which comprises the product which results from the addition to an aqueous solution of gelatin at a pH of 7.5–9.0 of 3–10% based on the weight of the gelatin, of 4,4'-diphenyl methane disulfonyl chloride.

7. A composition of matter adapted to form hardened layers which comprises the product which results from the addition to an qaueous solution of gelatin at a pH of 7.5–9.0 of 3–10%, based on the weight of the gelatin, of 1,5-naphthalene disulfonyl chloride.

8. A composition of matter adapted to form hardened layers which comprises the product which results from the addition of an aqueous solution of gelatin at a pH of 7.5–9.0 of 3–10%, based on the weight of the gelatin, of 4,4'-diphenyl disulfonyl chloride.

References Cited in the file of this patent

UNITED STATES PATENTS

| | | |
|---|---|---|
| 2,518,666 | Damschroder et al. | Aug. 15, 1950 |
| 2,614,928 | Yutzy et al. | Oct. 21, 1952 |
| 2,614,929 | Yutzy et al. | Oct. 21, 1952 |

OTHER REFERENCES

Mees: The Theory of The Photographic Process (pages 120 and 121) (1942), pub. The MacMillan Co., New York.

Karrer: Organic Chemistry 2nd ed., page 208, Elsevier Pub. Co., New York (1946).